United States Patent [19]

Friederich et al.

[11] Patent Number: 5,024,977

[45] Date of Patent: Jun. 18, 1991

[54] COMBINATION OF TWO SLIDING OR SEALING ELEMENTS AND A METHOD FOR PRODUCING THE SAME

[75] Inventors: Kilian Friederich, Plochingen; Dirk Rogowski, Bünzwangen, both of Fed. Rep. of Germany

[73] Assignee: Feldmuehle Aktiengesellschaft, Duesseldorf, Fed. Rep. of Germany

[21] Appl. No.: 253,125

[22] Filed: Oct. 4, 1988

[30] Foreign Application Priority Data

Oct. 6, 1987 [DE] Fed. Rep. of Germany ....... 3733730

[51] Int. Cl.$^5$ ............................................. C04B 35/56
[52] U.S. Cl. ........................................ 501/91; 501/92; 501/93; 428/543
[58] Field of Search .............................. 501/91, 92, 93; 428/543

[56] References Cited

U.S. PATENT DOCUMENTS

| | | | |
|---|---|---|---|
| 3,859,399 | 1/1975 | Bailey et al. | 501/91 |
| 3,960,577 | 6/1976 | Prochazka | 501/91 |
| 4,224,073 | 9/1980 | Sasaka et al. | 401/91 |
| 4,299,631 | 11/1981 | Kennedy et al. | 501/91 |
| 4,379,852 | 4/1983 | Watanabe et al. | 501/91 |
| 4,419,161 | 12/1983 | Hailey | 501/91 |
| 4,460,697 | 7/1984 | Hara et al. | 501/91 |
| 4,705,761 | 11/1987 | Kosugi | 501/91 |

FOREIGN PATENT DOCUMENTS

| | | | |
|---|---|---|---|
| 170889 | 1/1986 | European Pat. Off. | 501/91 |
| 57-42578 | 3/1982 | Japan | 501/91 |
| 57-196770 | 12/1982 | Japan | 501/91 |
| 61-6169 | 1/1986 | Japan | 501/91 |

*Primary Examiner*—Olik Chaudhuri
*Assistant Examiner*—Andrew Griffis
*Attorney, Agent, or Firm*—Felfe & Lynch

[57] ABSTRACT

A diphasic ceramic compact, sintered without pressure, is prepared for use in a combination of two sliding or sealing elements with improved control of the bearing surface portion of the functional surface; the compact contains 44 to 89.5 wt.-% of α- silicon carbide,
0.5 to 6 wt.-% of boron carbide, and
10 to 50 wt.-% of metal borides from groups 4b to 6b of the Periodic Table of Elements, and the metal boride content is increased at the functional surface.

10 Claims, No Drawings

COMBINATION OF TWO SLIDING OR SEALING ELEMENTS AND A METHOD FOR PRODUCING THE SAME

FIELD OF THE INVENTION

The present invention relates to a combination of two sliding or sealing elements with improved control of the bearing surface portion, with at least one diphasic ceramic compact, sintered without pressure, in sliding or sealing contact with a counter-surface, containing silicon carbide, boron carbide, metal borides and optionally free carbon.

BACKGROUND OF THE INVENTION AND THE PRIOR ART

Ceramic sliding or sealing elements are known. Such components must satisfy a wide range of requirements depending on how they are used, to mention only resistance to corrosion by aggressive media, resistance to thermal shock due to temperature changes in the media, and resistance to wear by media containing abrasive components. The materials heretofore proposed for sliding elements, such as hard metal, aluminum oxide, infiltrated or reaction-bonded silicon carbide and monophasic silicon carbide, have been able to satisfy no more than part of the list of requirements. For example, the hard metals have the disadvantage of corrosion and weight. Aluminum oxide is extraordinarily sensitive to thermal shock. Silicon carbide infiltrated with silicon fails when used in lyes which are important in the chemical industry. Monophasic silicon carbide makes it difficult to control the surface bearing portion of the functional surface.

Italian patent application 67 746 A/82 describes a sealing disk of silicon carbide which is combined with another disk of lesser hardness to achieve a reduction of friction.

West German Patent 35 09 572 discloses sliding elements in which a substrate of oxidic or nonoxidic ceramic is provided on its functional surface with coatings of oxides, carbides, nitrides or borides, these coatings having been applied by means of chemical or physical vapor deposition processes (CVD or PVD).

These matched pairs of sliding or sealing elements have failed to achieve any importance in practice, either because in the proposal of the Italian patent application the combining of different functional surfaces causes an undesirable surface alteration of the less hard surface, or because the sliding elements made in accordance with the proposal of West German Patent 35 09 572 do not allow economical mass production on account or the expensive CVD of PVD coating processes.

OBJECTS OF THE INVENTION

It is an object of the present invention to provide a combination of two sliding or sealing elements as well as a method for their manufacture, which, in addition to very good resistance to thermal shock, will have outstanding adhesion and sliding friction properties on the basis of a better control of the surface bearing percentage of the functional surface, where the following should be understood.

In the manufacture of the subject matter of the present invention it is of decisive importance that the friction between a pair of sealing or sliding elements be kept at an extremely low level without impairing the sealing action. Low friction forces are obtained when at least one surface of the elements in engagement with one another has a high degree of microblurring. The high microblurring indicates a low surface bearing portion, which is described as the ratio of the portion of the surface that is actually in bearing contact to the total surface area. The term "microblurring" is understood to mean a rounding of the individual grains at the grain boundaries, on the one hand, and on the other hand the differences in level between the different hard phases which are ablated to different degrees by machining.

DESCRIPTION OF THE INVENTION

The above object is achieved with the combination of sliding or sealing elements of the instant invention which consists of at least one diphasic ceramic compact, sintered without pressure, which is in sliding or sealing engagement at its functional surface with a second element of known composition. The second element, however, may also have the same composition as the ceramic diphasic compact sintered without pressure.

The ceramic diphasic compact contains:
44 to 89.5 wt.-% of α-silicon carbide,
0.5 to 6 wt.-% of boron carbide, and
10 to 50 wt.-% of metal borides,
the metals of groups 4b to 6b of the periodic table of elements being selected, and, if desired, a small content of free carbon, and it is free of aluminum of aluminum compounds. The metal borides form a discrete second phase in the compact and are concentrated at the functional surfaces.

The ceramic diphasic compact preferably contains:
44 to 86 wt.-% of α-silicon carbide,
4 to 6 wt.-% of boron carbide, and
10 to 50 wt.-% of metal borides.

The metal boride content of the compact can be set at 10 to 35 wt.-%, preferably at 10 to 20 wt.-%. This depends on the desired control of the surface bearing portion of the functional surface.

Zirconium diboride, tungsten boride ($W_2B_5$), niobium diboride or molybdenum boride as well as mixtures of two or more of these have proven suitable as metal borides. The choice will depend on the availability and price of the individual compounds. Zirconium diboride, however, is preferred.

The amount of free carbon that may still be present, which can be due to the process described further below, will preferably be selected not above 2 weight-percent, since greater percentages have an adverse influence on the strength characteristics of the diphasic ceramic compact. Therefore, carbon contents of less than 0.5 wt.-% are especially preferred.

In a process in accordance with the invention for the manufacture of the diphasic ceramic compact for a matched pair of sliding or sealing elements, first a starting powder mixture of 44 to 89.5 parts by weight of α-silicon carbide powder, 10 to 50 parts by weight of metal boride powder from groups 4b to 6b of the periodic table of elements, an additional boron source corresponding to 0.39 to 4.68 parts by weight of metallic boron, and a compound supplying elemental carbon corresponding to 0.5 to 5 parts by weight of carbon or elemental carbon are mixed intensively with one another. The grain size of the α-silicon carbide powder is selected to correspond to a specific surface area of 9 to 25 $m^2/g$, preferably 9 to 16 $m^2/g$. The grain size of the metal boride powder can be chosen between 0.5 and 15 $m^2/g$, preferably 0.5 to 2 $m^2/g$.

Preferably, a starting powder mixture of 44 to 86 parts by weight of α-silicon carbide powder, 10 to 50 parts by weight of metal boride powder from group 4b to 6b of the periodic table, an additional boron source corresponding to 3.12 to 4.68 parts by weight of metallic boron, and a compound supplying elemental carbon corresponding to 0.5 to 5 parts by weight of carbon or elemental carbon is thoroughly blended.

Metallic boron with a grain size corresponding to a specific surface area of 5 to 15 m$^2$/g or boron carbide powder with a grain size corresponding to a specific surface area of 3 to 15 m$^2$/g has proven to be a good boron source. The carbon source can be the common compounds known from the silicon carbide sintering art, as described, for example, in German Offenlegungsschrift (DE-OS) 24 49 662. The following are given as examples: phenolic resins of various types, polyvinyl alcohols, polyethylene glycols and elemental carbon. Phenolic resins are preferred, but elemental carbon in the form of carbon black with a specific surface area of about 200 m$^2$/g has proven to be especially desirable. A carbon black of this kind is obtainable, for example, as a black pigment for the printing ink industry. It is also possible, however, to select mixtures of pyrolyzable carbon sources and carbon black as the carbon source.

The powder components thus selected are subjected to intensive mixing. This can be done, for example, in a known ball mill, and, if necessary, another grinding of the individual powder components can be performed in inert fluids. After the mixing or grinding, it may be advantageous for certain requirements which must be met in the production of the green compacts to granulate the powder mixture in a spray drying process. In this manner free-flowing powders of uniform composition are obtained which can be further processed in automatic presses to form the green compacts.

However, the powder mixture can be processed by other methods known in the ceramic industry to produce green compacts, such as for example by injection molding, injection pressing or slip-casting processes.

If the green compacts require a temporary binder, for instance, on account of their complex shape or because of some machining operation, the binders disclosed in German Offenlegungsschrift (DE-OS) 24 49 662 can be used, which then, of course, must first be driven out or fired out before the actual sintering process.

The pressureless sintering of the green compacts is performed in a vacuum or a protective gas atmosphere at a temperature of 2100° to 2250° C., for a holding time of 0.5 to 3 hours. If the sintering is performed in a vacuum, a temperature of 2200° C. is selected for a holding time of one hour. The rate of heating up to the sintering temperature is set at 5° to 20° C. per minute.

For sintering in a protective gas atmosphere it is advantageous to use an argon atmosphere at a pressure of 0.1 to 1.0 bar. The sintering temperature in that case is 2100° to 2250° C. for a holding time of 0.5 to 3 hours. The rate of heating to the sintering temperature is 5° to 20° C./min.

After the sintering process and the cooling of the diphasic ceramic compact, the metal boride content on the intended functional surface is raised by reducing the silicon carbide content by a known surfacing operation to a depth of 0.05 to 0.6 μm. By this treatment a controlled adjustment of the surface bearing portion according to the desired ultimate use can be performed.

The reduction of the silicon carbide content on the functional surface can be performed by controlled ablative processing of the individual silicon carbide grains. This can be accomplished by mechanical working such as grinding, lapping or polishing, or by a combination of these methods.

Since the diphasic ceramic compact possesses electrical conductivity, the surface treatment can also be performed by the known spark erosion method.

Another preferred surface treatment is chemical etching. For this purpose a compact, prepared by grinding and lapping the functional surface, is exposed in a plasma chamber to an atmosphere of oxygen and carbon tetrafluoride (CF$_4$). The total pressure in the plasma chamber is adjusted to $10^{-2}$ to $10^{-1}$ mbar, the partial pressure of oxygen being $5 \times 10^{-4}$ to $9 \times 10^{-2}$. In the plasma state, oxygen radicals, trifluorocarbon radicals and fluorine radicals form in this atmosphere. These radicals react with silicon to form silicon tetrafluoride or with carbon to make carbon dioxide. The gaseous compounds are aspirated out through the vacuum system. Thus silicon carbide is selectively removed at the originally planar surface, and the dispersed metal boride particles forming the second phase remain as raised components. The ablation of silicon carbide can also be varied between 0.05 and 0.6 μm by controlling the chemical etching time in the plasma chamber.

A diphasic ceramic compact made by the above method for combinations of two sliding or sealing elements, whose starting powder mixture consisted of 81.4 wt.-% of α-silicon carbide, 4.0 wt.-% of metallic boron, 4.6 wt.-% of carbon black and 10.0 wt.-% of zirconium diboride and which was sintered for one hour in a vacuum at 2190° C., has the following material characteristics:

Density ρ 3.23 g/cm$^3$ corresponding to 97% of the theoretical density

Strength at rupture B 270 to 350 MPa

Weibull's modulus m 10.6

E-modulus 410 GPa

Toughness 4 MPa m 1/2

The following thermal characteristics were determined:

Coefficient of expansion $a = 3.5 \times 10^{-6}$ K$^{-1}$

Thermal conductivity = 100 W/mK.

The thermal shock resistance was ΔT 200° C. upon quenching in water. The specimen remained free of cracks.

The above-described diphasic ceramic compacts can be used, for example, as sliding rings in pump construction, as seals in sanitary fittings, suction box linings or tube suckers in machinery of the paper industry, but also as elements of machinery in general machine construction where highly wear-resistant parts are in frictional contact under the influence of corrosive or abrasive media.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A combination of sliding or sealing elements with improved control of the bearing surface portion, said combination comprising at least one diphasic ceramic compact, sintered without pressure, in sliding or sealing contact with a counter-surface, and containing silicon carbide, boron carbide, metal borides and optionally free carbon, where the sintered compact contains 44 to 89.5 wt.-% of α-silicon carbide
0.5 to 6 wt.-% of boron carbides, and
10 to 50 wt.-% of metal borides, the metal borides being selected from groups 4b to 6b of the periodic system and form a second disperse phase in the sintered compact, and has a heightened metal boride content in the compact's functional surface in sliding or sealing engagement.

2. A combination of sealing or sliding elements of claim 1, where the sintered compact contains 44 to 86 wt.-% of α-silicon carbide, 4 to 6 wt.-% of boron carbide and 10 to 50 wt.-% of metal borides.

3. A combination of sealing or sliding elements of claim 1, where the sintered compact contains 10 to 35 wt.-% of metal borides.

4. A combination of sealing of sliding elements of claim 1, where the sintered compact contains 10 to 20 wt.-% of metal borides.

5. A combination of sealing or sliding elements of claim 1, where the sintered compact contains zirconium diboride as the metal boride component.

6. A combination of sealing or sliding elements of claim 1, where the sintered compact contains tungsten boride ($W_2B_5$) as the metal boride component.

7. A combination of sealing of sliding elements of claim 1, where the sintered compact contains niobium diboride as the metal boride component.

8. A combination of sealing or sliding elements of claim 1, where the sintered compact contains molybdenum boride as the metal boride component.

9. A combination of sealing or sliding elements of claim 1, where the sintered compact contains a mixture of two or more of zirconium diboride, tungsten boride ($W_2B_5$), niobium diboride or molybdenum boride as the metal boride component.

10. A combination of sealing or sliding elements of claim 1, where the sintered compact contains up to 2 wt.-% of free carbon.

* * * * *

UNITED STATES PATENT AND TRADEMARK OFFICE
CERTIFICATE OF CORRECTION

PATENT NO. : 5,024,977
DATED : June 18, 1991
INVENTOR(S) : Kilian Friederich et al It is certified that error appears in the above-identified patent and that said Letters Patent is hereby corrected as shown below:

Column 1, line 52, "or" should read --of--.

Column 1, line 53, "of" should read --or--.

Column 4, line 34, "2190°C" should read --219°C--.

Signed and Sealed this

Twenty-sixth Day of January, 1993

Attest:

STEPHEN G. KUNIN

*Attesting Officer*　　*Acting Commissioner of Patents and Trademarks*